(12) United States Patent
Sheridon

(10) Patent No.: US 6,396,621 B1
(45) Date of Patent: May 28, 2002

(54) GYRICON DISPLAY CONTAINING CHEMICAL ABSORBENTS

(75) Inventor: Nicholas K. Sheridon, Los Altos, CA (US)

(73) Assignee: Xerox Corporation, Stamford, CT (US)

( * ) Notice: Subject to any disclaimer, the term of this patent is extended or adjusted under 35 U.S.C. 154(b) by 12 days.

(21) Appl. No.: 09/749,688

(22) Filed: Dec. 28, 2000

(51) Int. Cl.$^7$ .................... G02B 26/00; G09G 3/34
(52) U.S. Cl. .................... 359/296; 345/107; 345/85; 264/4.7; 427/213.3
(58) Field of Search .................... 359/296; 345/85, 345/107; 349/86; 427/213.3, 213.31, 213.34, 213.36; 428/323, 327, 402.21, 407; 264/4.7, 343; 523/207, 210

(56) References Cited

U.S. PATENT DOCUMENTS

| | | | |
|---|---|---|---|
| 3,714,065 A | * 1/1973 | Kitajima et al. | 424/494 |
| 3,779,756 A | * 12/1973 | Farran et al. | 430/214 |
| 4,187,194 A | * 2/1980 | Wellman et al. | 264/4 |
| 4,257,884 A | * 3/1981 | Lim | 210/198.2 |
| 4,261,653 A | 4/1981 | Goodrich | 359/296 |
| 4,936,916 A | * 6/1990 | Shinmitsu et al. | 264/4.7 |
| 5,262,098 A | 11/1993 | Crowley et al. | 264/8 |
| 5,296,331 A | * 3/1994 | Taguchi | 427/180 |
| 5,344,594 A | 9/1994 | Sheridon | 264/4.1 |
| 5,389,945 A | 2/1995 | Sheridon | 345/85 |
| 5,717,079 A | * 2/1998 | Viski et al. | 534/649 |
| 5,717,514 A | 2/1998 | Sheridon | 359/296 |
| 5,815,306 A | 9/1998 | Sheridon et al. | 359/296 |
| 5,989,629 A | 11/1999 | Sacripante et al. | 427/180 |
| 6,054,071 A | * 4/2000 | Mikkelsen, Jr. | 264/1.36 |
| 6,097,531 A | 8/2000 | Sheridon | 359/296 |

* cited by examiner

Primary Examiner—Evelyn A Lester
(74) Attorney, Agent, or Firm—Oliff & Berridge, PLC

(57) ABSTRACT

A gyricon sheet including a binder with rotating elements and dielectric fluid therein, and further including a chemical absorbent in association therewith. The chemical absorbent, such as zeolite or charcoal, absorbs contaminants present in the gyricon sheet that interfere with the reliable operation of the display. The chemical absorbent may be present either in the gyricon sheet itself or in a separate scavenger layer adjacent to and in contact with the gyricon sheet. The presence of the chemical absorbent significantly increases the length of time that the display can reliably display images.

23 Claims, 2 Drawing Sheets

GYRICON DISPLAY CONTAINING CHEMICAL ABSORBENTS

BACKGROUND OF THE INVENTION

1. Field of the Invention

The present invention relates to visual displays, particularly to addressable, reusable, paper-like visual displays, and more particularly to gyricon or twisting-ball displays.

2. Discussion of Related Art

A gyricon display, also called the twisting-ball display, rotary ball display, particle display, dipolar particle light valve, etc., offers a technology for making a form of electric paper. Briefly, a gyricon display is an addressable display made up of a multiplicity of optically anisotropic balls, each of which can be selectively rotated to present a desired face to an observer. For example, a gyricon display can incorporate balls each having two distinct hemispheres, one black and the other white, with each hemisphere having a distinct electrical characteristic (e.g., zeta potential with respect to a dielectric fluid) so that the balls are electrically as well as optically anisotropic. The black-and-white balls are embedded in a sheet of optically transparent material, such as an elastomer layer, that contains a multiplicity of spheroidal cavities and is permeated by a transparent dielectric fluid, such as a plasticizer. The fluid-filled cavities accommodate the balls, one ball per cavity, so as to prevent the balls from migrating within the sheet. A ball can be selectively rotated within its respective fluid-filled cavity, for example by application of an electric field, so as to present either the black or the white hemisphere to an observer viewing the surface of the sheet. Thus, by application of an electric field addressable in two dimensions (as by a matrix addressing scheme), the black and white sides of the balls can be caused to appear as the image elements (e.g., pixels or subpixels) of a displayed image.

An exemplary gyricon display 10 is shown in side view in FIG. 1. Bichromal balls 11 are disposed in an elastomer binder of the sheet 12 that is swelled by a dielectric fluid creating cavities 13 in which the balls 11 are free to rotate. The balls 11 are electrically dipolar in the presence of the fluid and so are subject to rotation upon application of an electric field, as by matrix-addressable electrodes 14a, 14b. The electrode 14a closest to viewing surface 15 is preferably transparent. An observer at I sees an image formed by the black and white pattern of the balls 11 as rotated to expose their black or white faces (hemispheres) to the viewing surface 15 of sheet 12.

U.S. Pat. No. 5,389,945, incorporated by reference herein, shows that gyricon displays can be made that have many of the desirable qualities of paper, such as flexibility and stable retention of a displayed image in the absence of power, not found in CRTs, LCDs, or other conventional display media. Gyricon displays can also be made that are not paper-like, for example, in the form of rigid display screens for flat-panel displays.

Typically, known gyricon displays are made up of bichromal balls that are black on one hemisphere and white on the other. Other kinds of balls are also known. For example, U.S. Pat. No. 4,261,653 shows a multilayer ball, although it is made at least in part from glass and its use depends on an addressing scheme involving high-frequency electric fields.

Other commonly owned patents related to gyricon displays, each incorporated herein by reference in their entireties, include U.S. Pat. Nos. 5,262,098, 5,344,594, 5,717,514, 5,815,306, 5,989,629 and 6,097,531.

One shortcoming of gyricon displays that still needs improvement is the fact that the bichromal balls typically suffer a fixed loss of their dipole moments shortly after the displays are made. This is not a continuous loss process, but rather a step loss. If the bichromal balls have a large dipole moment to begin with, this will not result in an appreciable loss in the brightness or contrast of the display. However, as is the case with bichromal balls made from many pigments, the dipole moments are not especially large and the step loss in their dipole moments results in severe deterioration of the display properties.

SUMMARY OF THE INVENTION

It is therefore an object of the present invention to develop a gyricon display that possesses a longer stable operating time without adversely affecting the quality of the images displayed.

This and other objects of the present invention are achieved herein by inclusion of a chemical absorbent in association with the gyricon sheet. The chemical absorbent may be mixed into the elastomer of the gyricon sheet itself, it may be included in a separate scavenger layer directly adjacent and in contact with the gyricon sheet or it may be placed adjacent to the gyricon sheet.

These and other objects are also achieved by methods of making the gyricon sheet and methods of packaging the gyricon sheet into a display, which methods include incorporating the chemical absorbent into or adjacent to the gyricon sheet.

DETAILED DESCRIPTION OF PREFERRED EMBODIMENTS

Figure 1:
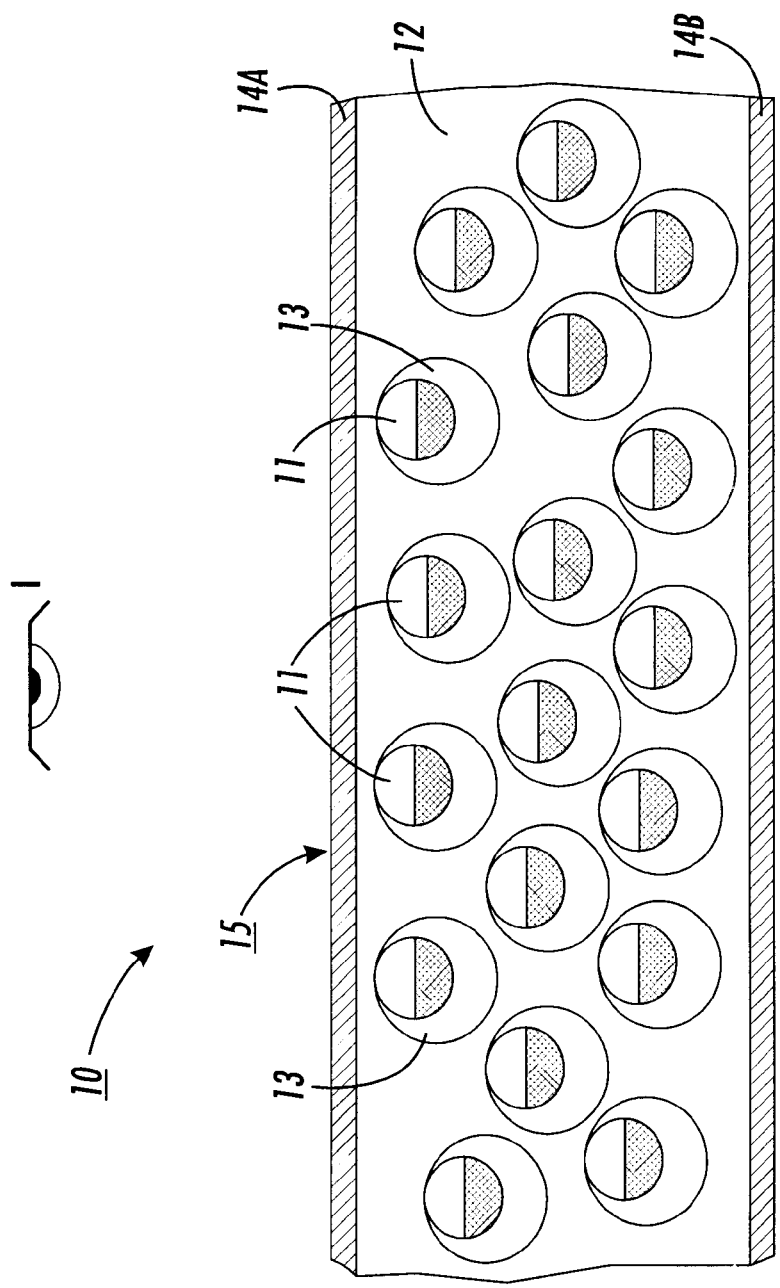
FIG. 1 is a cutaway side view of a conventional black-and-white gyricon display.
Figure 2:
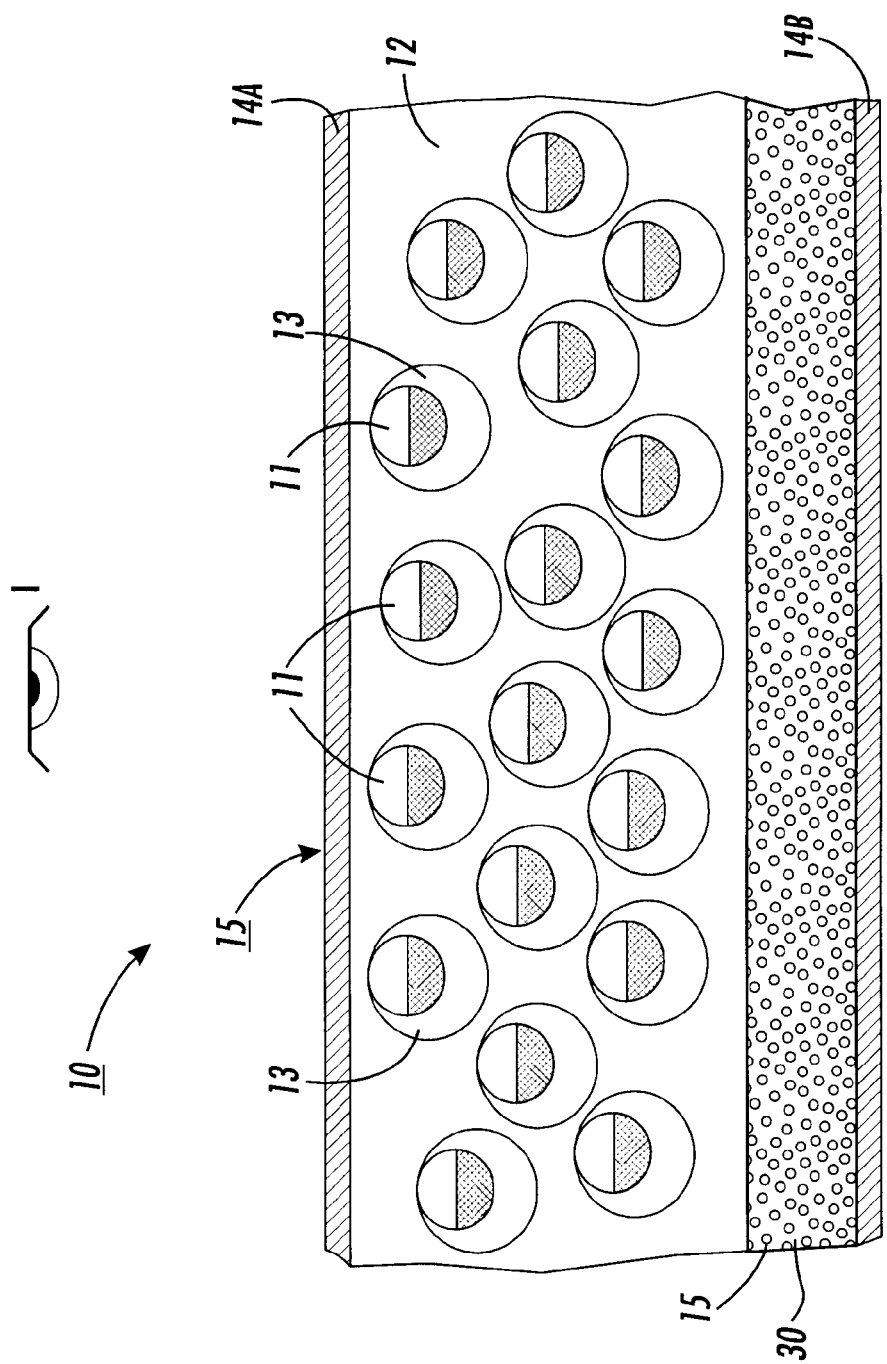
FIG. 2 is a cutaway side view of a gyricon display having a scavenger layer of chemical absorbents associated therewith.

A gyricon sheet typically comprises spherically symmetric rotating elements with anisotropic electrical and optical properties. For example, as shown in FIG. 2, rotating elements 11 can be made to rotate and thus exhibit changes in optical properties by the imposition of external electrical fields. Each of the rotating elements 11 are located in individual oil filled cavities 13 in a transparent optical medium 12. In FIG. 2, the rotating elements 11 are in the form of a bichromal rotating elements having segments (hemispheres) with different electrical and optical properties. When voltages are applied to the addressing electrodes, the rotating elements 11 will rotate, presenting either the black segment or the white segment of the rotating elements to the viewer.

The rotating elements in the gyricon sheets of the present invention may be any type known in the art without limitation. As is well understood in the art, the principal requirement of the rotating elements is that they must be electrically anisotropic in the presence of a dielectric fluid so as to be subject to rotation upon application of an electric field, for example as by matrix-addressable electrodes. Typically, gyricon sheets are made up of bichromal balls that are black in one hemisphere and white in the other. The coatings preferably create optical anisotropy in the rotating elements.

Other kinds of rotating elements are also known. For example, U.S. Pat. No. 4,261,653, incorporated herein by reference, shows a multilayer ball, although it is made at least in part from glass and its use depends on an addressing scheme involving high-frequency electric fields. U.S. Pat. No. 5,815,306, incorporated herein by reference, shows an array of rotatable lens imaging elements, such as spherical lenses having aperture masks or aperture stops. U.S. Pat. No. 5,717,514, incorporated herein by reference, shows polychromal segmented balls.

In one embodiment, the rotating elements have hemispherical coatings of different zeta potential. For example, the difference in zeta potential can be achieved by applying a coating to one hemisphere of each of the spheres that exhibits optical absorption characteristics, and by applying a coating to the other hemisphere of each of the spheres that exhibits light reflectance characteristics. The difference between the light reflectance-light absorption characteristics of the hemispheres provides a desired optical anisotropy. For example, the spheres may be comprised of white glass with a black, light absorbent layer, such as co-evaporated magnesium fluoride and indium, deposited on one hemisphere to provide the spheres with the desired light reflective and light absorptive hemispheres.

Due to the difference in zeta potential between the segments of the rotating elements and the immersion of each of the elements in the dielectric fluid, the rotating elements acquire an electrical charge where, for example, one hemisphere is more positive than the other hemisphere of the rotating element. When a power source is applied, the rotating elements can be made to rotate in the electric field developed by the energized electrodes, such that the desired hemisphere can be oriented toward a viewer.

The rotating elements can have a size of from, for example, about 1 to about 200 microns, more preferably from about 20 to about 100 microns as measured with a measuring microscope, with hemispheres of contrasting, or different colors and dissimilar zeta potentials and more specifically opposite surface charges.

The rotating elements are embedded in a gyricon sheet of optically transparent material, such as an elastomer layer, that contains a multiplicity of spheroidal cavities and is permeated by a transparent dielectric fluid, such as a plasticizer. Each of the spheres is located within a cavity of the transparent material. The cavities have a diameter that is slightly larger than the diameter of the rotating elements so that the rotating elements have rotational freedom without translational freedom. Filling the voids between the rotating elements and the cavities is an optically transparent dielectric fluid. The fluid-filled cavities accommodate the balls, one ball per cavity, so as to prevent the balls from migrating within the gyricon sheet. A ball can, however, be selectively rotated within its respective fluid-filled cavity, for example by application of an electric field, so as to present a desired segment of the rotating element to an observer viewing the surface of the sheet.

The gyricon sheet thus includes a distribution of minute rotating elements 12 which are electrically, and preferably also optically, anisotropic. The rotating elements are surrounded by a transparent dielectric fluid which causes the rotating elements to have an electrical anisotropy.

The gyricon sheet may be formed by thoroughly mixing the rotating elements with an uncured (liquid), optically transparent material, for example, an uncured elastomer such as Dow Corning Sylgard 184. The optically transparent material is then cured, such as by rapid heating to an elevated temperature, with or without a curing agent as needed. The rotating elements will be embedded in this binder and refrained from either rotational or translational movement. Following curing of the binder, the slab is placed in a dielectric fluid, for example an oil and/or plasticizer, for a period of time for the binder to absorb the dielectric fluid and reach an equilibrium point in such absorption. The dielectric fluid may be any liquid material possessing dielectric properties that can be absorbed by the optically transparent binder material. Examples include silicon oil, fully fluorinated plasticizers, etc.

When the cured binder is placed in the dielectric fluid, the liquid is absorbed by the material resulting in a swelling of the material. The rotating elements are made of a material which does not readily absorb the dielectric fluid, with the result that the swelling of the binder creates the cavities around the rotating elements. The voids or cavities are filled with the dielectric fluid and this structure allows easy rotation of the spheres while permitting essentially no translation of the spheres.

The optically transparent binder need not be an elastomer and in lieu thereof may be a rigid plastic such as polyethylene, polystyrene or plexiglass. Encapsulation can be achieved with the encapsulant molten or dissolved in a volatile solvent. An uncured rigid material such as an epoxy can be used as the encapsulant binder provided that it is light transparent. It is still necessary that the material of the gyricon sheet absorb the dielectric fluid more readily than do the spheres in order that the cavities may be formed. When the material of the gyricon sheet binder is an elastomer, the spheres can be plastics such as polyethylene or polystyrene which do not absorb plasticizers as readily as elastomers. When the material of the binder is a plastic, the spheres must be of a material which does not absorb the plasticizer, such as glass, or absorbs the plasticizer substantially less than the plastic.

As was discussed in the background section above, some existing gyricon sheets suffer from shortened reliable operating periods, the quality of the images displayed by the gyricon sheet typically deteriorating after less than 24 hours of use. It has been found by the present inventors that a cause of the rapid degradation appears to be the presence of conductivity-increasing contaminants in the gyricon sheet itself, resulting in free ions. Although the exact nature, i.e., chemical make-up, of the contaminants is not known, the inventors have determined that the presence of the contaminants causes the conductivity of the gyricon sheet, and the plasticizing liquid in the cavities surrounding the rotating spheres in particular, to increase rapidly. The source of the contaminant also is not known with particularity, but could come from any of the rotating elements, the optically transparent binder and/or the curing process of the binder, the dielectric fluid, etc.

The increase in conductivity has the effect of interfering with the proper rotation of the rotating elements upon application of the electric field, and thus the desired segment of the rotating element not being displayed to the viewer. For example, whereas a rotating element is desired to be rotated 180 degrees upon application of the electric field, the build-up in conductivity as a result of the presence of the contaminants results in the rotating element rotating only, for example, 60 degrees, and thus not being properly displayed.

The increase in conductivity, and accompanying deterioration in performance of the gyricon sheet, is believed to be due to the fairly rapid accumulation of the contaminant materials in and around the rotating elements. The optically transparent binder of the sheet has a fairly low dielectric constant, whereas the rotating spheres possess a fairly high dielectric constant. It is to be expected that with many periodic reversals of the voltage across the display, the contaminants will tend to accumulate in the vicinity of the high dielectric constant balls, where the field strength is the greatest.

The inventors have found that inclusion of a chemical absorbent, also referred to as a scavenger in this specification, in association with the gyricon sheet can absorb the contaminants from the gyricon sheet, and thus prevent the accumulation of the contaminants in and around the rotating elements. This, in turn, avoids the conductivity increase experienced with gyricon sheets, and enables long-term stable operation of the gyricon sheet. For example, the gyricon displays of the present invention that include chemical absorbents in association with the gyricon sheet exhibit stable, reliable operation, i.e., continued display of desired images without quality deterioration, for at least 6000 hours. Identical displays made without the use of the scavenger materials deteriorated objectionably within 24 hours.

The chemical absorbents suitable for use in the present invention may be of any type well known to absorb chemical materials, typically these are porous materials, the pores of which possess an enormous wall surface area and an affinity for adsorbing hydrocarbons and other contaminants on the surfaces of these walls. The absorbents are typically available as powders with an average particle diameter of less than 100, preferably less than 20, most preferably less than 2, microns being used. Smaller sized absorbents are preferred so as not to interfere with the quality of the display.

The chemical absorbent may be, for example, charcoal, clays such as Montmorillorite, some types of zeolite, etc. Most preferably, the chemical absorbent is a zeolite having an average pore size (diameter) of at least 13 Angstroms. Although porous molecular sieve materials having smaller average pore sizes may be used, it appears that better performance is achieved utilizing absorbents having at least the foregoing average pore size. A most preferred absorbent is 13X zeolite, for example as sold by the Aldrich Chemical Company.

In a first embodiment of the present invention, the chemical absorbents are incorporated directly into the gyricon sheet itself. This may be done, for example, by mixing in the chemical absorbent with the optically transparent binder and the rotating elements prior to curing of the binder. The amount of chemical absorbents to add to the binder preferably ranges from about 0.1 to about 50 percent by weight of the sheet, more preferably from about 0.5 to about 25 percent by weight of the sheet. Alternatively, the chemical absorbents may be mixed with an uncured elastomer sheet, which is subsequently cured and placed adjacent to the gyricon sheet.

Although mixing the chemical absorbent into the gyricon sheet itself works well in absorbing the contaminants, it has a minor downside in that the absorbents absorb other materials, in particular curing agents of the binder, when added to the binder. This makes less absorbent space of the absorbent available to scavenge the undesired contaminants from the gyricon sheet, and thus somewhat lessens the effectiveness of the absorbent in the sheet.

In one aspect of this embodiment, the scavenger layer is prepared by mixing the chemical absorbent with the uncured binder and thereafter curing the binder. The scavenger layer so formed may then be placed next to the gyricon sheet to form the gyricon display.

In another aspect of this embodiment, after mixing the chemical absorbent with the binder, the binder is partially cured. The gyricon sheet materials may then be coated onto the partially cured scavenger layer, for example by doctor blading and the like, and then the two layers cured to completion. In this manner, the layers bind together and the scavenger layer becomes a permanent part of the display. The amount of scavenger chemical typically added to the elastomer for this purpose is equal to about 0.01 grams/centimeter$^2$ of the display.

A second embodiment is thus to include the chemical absorbent in a separate scavenger layer that is immediately adjacent to and in contact with the gyricon sheet comprised of the optically transparent binder, the rotating elements and the dielectric fluid. This is shown in FIG. 2, wherein gyricon sheet 12 contains the rotating elements 11, transparent binder 12 and dielectric fluid, and the scavenger layer 30 containing the chemical absorbent 35 is adjacent to and in contact with the gyricon sheet 12. Most preferably, the scavenger layer is located on a side of the gyricon sheet that is away from a viewer of the image displayed by the sheet, thereby not interfering with the quality of the image displayed. Again, an amount of chemical scavenger equal to about 0.01 grams/centimeter$^2$ of display area is used for this layer.

It has been found difficult to apply a uniformly thick layer of this chemical absorbent and methods of applying uniform layers of the chemical absorbent have been sought. One useful technique is to place a screen made from an insulating material on one side of the display. A paste made from the plasticizing liquid and the chemical absorbent powder is then applied to this screen with a spatula, such that the paste is forced into the holes of the screen and does not reside on the surface of the screen. It has been found that, even though it is difficult to apply a uniform amount of the chemical absorbent paste over the surface of the screen, for purposes of the electric field that causes the rotation of the bichromal balls, a very uniformly thick layer is obtained and the display has constant properties across its surface. Typically, equal parts by weight of plasticizer oil and chemically absorbent powder are mixed together to make the paste and the distribution of chemically absorbent powder is about 0.005 grams/centimeter$^2$. Screens having thicknesses of 2 to 5 mils have been found useful for this purpose, with fiber densities of 100 or more fibers per inch and open areas of 20% or more. Most preferred is a screen with a thickness of 2 mils and a fiber density of 300 fibers per inch and an open area of 40%.

In a variation of the above embodiment, the screen might be replaced by an embossed plastic sheet having a multiplicity of pockets to hold the scavenger powder, or any such structure having a multiplicity of mechanical sequestering structures but a uniform thickness.

A third embodiment is to place the chemical absorbent material in the space adjacent to the gyricon sheet but not in the openings of the sheet and to again place the gyricon sheet on the above described sheet. It is found that under the electro-hydrodynamic conditions associated with switching of the addressing field, sufficient plasticizing liquid is caused to flow through the scavenger material and to subsequently flow through the screen, and thus under the gyricon sheet, that here too contaminants are eliminated. It is found that an amount of the chemical scavenger equal to about 0.003 grams/centimeter$^2$ of display surface area should be placed in this peripheral region for good effectiveness.

A fourth embodiment of the chemical absorbent layer is to eliminate deleterious effects occasioned by the epoxies or other adhesive materials used to seal the display. It is found that these can deteriorate the quality of that portion of the gyricon sheet near such seals, probably by chemical means. Placing a layer of the chemical absorbent in the space between the gyricon sheet and such seals has been found to eliminate the deterioration of the gyricon sheet. Here an amount of the chemical absorbent equal to about 0.01 grams/centimeter$^2$ of gyricon sheet periphery has been found to work well.

In a fifth embodiment of the use of chemical absorbents, said chemical absorbents are mixed with paper fibers prior to forming such paper fibers into a sheet of paper by conventional means. The paper is subsequently dried, preferably under vacuum conditions and with heat, to remove the water from both the paper fibers and from the pores of the chemical absorbent. The chemical absorbent powder is thus embedded in and mechanically bound by the paper fibers. The sheet of special paper thus fabricated is then placed under the gyricon sheet during the manufacturing process. This approach is especially attractive for its ease of being incorporated in convention lamination processes during display manufacture. While this embodiment has been described in connection with paper fibers, it can also be implemented with any other types of fibers, such as plastic fibers, ceramic and asbestos fibers, fabric fibers such as cotton, nylon, rayon and the like, and any other such structure that can be used to mechanically bind the chemical absorbent powders long enough to enable assembly of display devices with them. Here again, a chemical absorbent loading of about 0.005 grams/centimeter$^2$ is adequate for contaminations encountered to date.

These binders need not be transparent since they can be placed on the side of the gyricon sheet that is not viewed. In a preferred method of assembly, the sheet or layer containing the scavenger material would first be placed on a non-viewing substrate and the gyricon sheet, having already been swollen with plasticizer, would be placed on top of it. Subsequently, the viewing window would be applied.

The amounts of chemical scavenger material placed in a layer adjacent to the gyricon sheet is thus from 0.001 to 0.05 grams/centimeter$^2$ with 0.005 grams/centimeter$^2$ being preferred. When the chemical scavenger layer is placed around the periphery of the gyricon display to protect it from the effects of cell sealant chemicals the amount is between 0.001 and 0.1 grams/centimeter$^2$ of periphery with 0.01 grams/centimeter$^2$ being preferred.

In a sixth embodiment of the use of chemical absorbent materials, the chemical absorbent powder is mixed with a high viscosity oil that is spread in a uniform layer under the gyricon sheet in the assembly process. It is necessary that the oil used in this case not have a chemical affinity for the elastomer used in the gyricon sheet that would cause it to plasticize the sheet, since this would introduce a great increase in the viscosity of the liquid in the cavities over time and thus have a negative effect on the bichromal ball rotation. Examples of oils that have proven effective in this application include Dow Coming FS 1265 oil, triglycerides such as tributin and fully fluorinated oils such as Y-46 by the Fomblin Chemical Co. and FC-70 and FC-75 by the 3M Corporation.

Preferably, the binder of the scavenger layer is also soaked in and permitted to absorb a dielectric fluid prior to or during the display assembly process. Doing so prevents dielectric fluid from being desorbed from the gyricon sheet when in contact with the scavenger layer.

The gyricon sheet of the invention may be sandwiched between substrates in fabricating the display panel. Interposed between the gyricon sheet and its adjacent scavenger layer and one of the substrates may be a first grid of parallel electrical conductors, with a corresponding second grid, having parallel electrical conductors oriented orthogonally relative to the conductors of the first grid is then provided between the second substrate and the gyricon sheet. At least one of the substrates and the conductors of the grid adjacent that substrate are optically transparent so that ambient light can impinge upon the display panel and so that the display provided by the panel can be viewed. A suitable substrate may be comprised of, for example, glass.

Although the invention has been described with reference to specific preferred embodiments, it is not intended to be limited thereto. Rather, those having ordinary skill in the art will recognize that variations and modifications may be made therein which are within the spirit of the invention and within the scope of the claims.

What is claimed is:

1. A gyricon sheet comprising a binder having rotating elements and dielectric fluid therein, and wherein the gyricon sheet further includes a chemical absorbent in association therewith.

2. The gyricon sheet according to claim 1, wherein the chemical absorbent is mixed into the binder.

3. The gyricon sheet according to claim 2, wherein the chemical absorbent is present in an amount of from about 0.1% to about 50% by weight of the gyricon sheet.

4. The gyricon sheet according to claim 1, wherein the chemical absorbent is contained in a scavenger layer adjacent to and in contact with the gyricon sheet.

5. The gyricon sheet according to claim 4, wherein the scavenger layer further comprises a scavenger layer binder.

6. The gyricon sheet according to claim 5, wherein the scavenger layer binder is comprised of a material that is the same as the binder of the gyricon sheet.

7. The gyricon sheet according to claim 5, wherein the scavenger layer binder is paper.

8. The gyricon sheet according to claim 4, wherein the chemical absorbent is present in the scavenger layer in an amount of from about 0.001 to about 0.05 grams/centimeter$^2$ of the scavenger layer.

9. The gyricon sheet according to claim 4, wherein the scavenger layer also contains dielectric fluid.

10. The gyricon sheet according to claim 1, wherein the chemical absorbent is a microscopically porous material capable of binding chemicals to the walls of its pores.

11. The gyricon sheet according to claim 1, wherein the chemical absorbent is a Montmoillorite clay, a zeolite or charcoal.

12. The gyricon sheet according to claim 1, wherein the chemical absorbent is a zeolite having an average pore diameter of at least 13 Angstroms.

13. The gyricon sheet according to claim 1, wherein the gyricon sheet is sandwiched between two substrates.

14. The gyricon sheet according to claim 13, wherein the substrates comprise glass.

15. The gyricon sheet according to claim 13, wherein the substrates are sealed together with an adhesive, and wherein the chemical absorbent is located between the gyricon sheet and the adhesive.

16. A method of making a gyricon sheet comprised of a binder having rotating elements and dielectric fluid therein, and wherein the gyricon sheet further includes a chemical absorbent in association therewith, the method comprising
   mixing the binder, rotating elements and the chemical absorbent together,
   curing the binder in sheet form, and placing the sheet in contact with the dielectric fluid to permit absorption of the dielectric fluid into the sheet.

17. A method of making a gyricon sheet comprised of a binder having rotating elements and dielectric fluid therein, and wherein the gyricon sheet further includes a chemical absorbent in association therewith, the method comprising forming a scavenger layer containing the chemical absorbent; and bringing the scavenger layer into contact with a surface of the gyricon sheet.

18. The method according to claim 17, wherein the forming of the scavenger layer is by mixing the chemical absorbent with uncured binder and thereafter curing the binder.

19. The method according to claim 17, wherein the forming of the scavenger layer is by mixing the chemical absorbent with uncured binder and thereafter partially curing the binder of the scavenger layer, and wherein the bringing the scavenger layer into contact with a surface of the gyricon sheet comprises coating the gyricon sheet onto a surface of the partially cured scavenger layer, and the method further comprises subsequently fully curing both the scavenger layer and the gyricon sheet.

20. The method according to claim 17, wherein the forming of the scavenger layer is by mixing the chemical absorbent with paper pulp, forming the mixture into the scavenger layer and drying all water from the scavenger layer.

21. The method according to claim 17, wherein the forming of the scavenger layer is by mixing the chemical absorbent with fiber materials that are subsequently compressed into sheet-like form.

22. The method according to claim 17, wherein the forming of the scavenger layer is by mixing the chemical absorbent with a high viscosity oil, placing a layer of the oil and absorbent onto a surface, and then placing the binder on top of the oil to achieve the scavenger layer.

23. A method of making a gyricon sheet comprised of a binder having rotating elements and dielectric fluid therein, and wherein the gyricon sheet further includes a chemical absorbent in association therewith, the method comprising forming a mixture of a dielectric fluid and the chemical absorbent, forming a sheet from such mixture on the gyricon sheet by applying the mixture through a screen or embossed plastic sheet.

* * * * *